US012771657B2

(12) United States Patent
Chen

(10) Patent No.: US 12,771,657 B2
(45) Date of Patent: Oct. 20, 2026

(54) SIGNAL COMPENSATION DEVICE AND ASSOCIATED METHOD

(71) Applicant: Realtek Semiconductor Corp., HsinChu (TW)

(72) Inventor: Chun-Yi Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 505 days.

(21) Appl. No.: 18/225,166

(22) Filed: Jul. 24, 2023

(65) Prior Publication Data

US 2024/0064117 A1 Feb. 22, 2024

(30) Foreign Application Priority Data

Aug. 18, 2022 (TW) .................................. 111131102

(51) Int. Cl.
*H04L 49/9047* (2022.01)
*H04L 65/752* (2022.01)
(Continued)

(52) U.S. Cl.
CPC ........ *H04L 49/9047* (2013.01); *H04L 65/752* (2022.05); *H04N 21/2393* (2013.01);
(Continued)

(58) Field of Classification Search
CPC .............. H04L 49/9047; H04L 65/752; H04N 21/2393; H04N 21/4381; H04N 21/44004; H04N 21/4622
See application file for complete search history.

(56) References Cited

U.S. PATENT DOCUMENTS 11,546,653 B2 1/2023 Chen
2006/0005099 A1* 1/2006 Strasman ................. H04L 1/22 714/746
(Continued)

FOREIGN PATENT DOCUMENTS

CN 103718563 B 3/2019
CN 113950815 A 1/2022
(Continued)

OTHER PUBLICATIONS

Wikipedia, "Packetized elementary stream", p. 1, Nov. 8, 2021.

*Primary Examiner* — Natasha W Cosme
*Assistant Examiner* — Benjamin T. Ranew
(74) *Attorney, Agent, or Firm* — Winston Hsu

(57) ABSTRACT

A signal compensation device includes a first receiving circuit, a second receiving circuit, a first buffer, a second buffer, a third buffer, and a processing circuit. The first receiving circuit receives a first video signal from a first video source. The second receiving circuit receives a second video signal from a second video source, wherein both the first video signal and the second video signal correspond to a same program. The first buffer stores a first transport stream (TS) packet group corresponding to the first video signal. The second buffer stores a second TS packet group corresponding to the second video signal. The processing circuit dynamically stores a first TS packet of the first TS packet group or a second TS packet of the second TS packet group to the third buffer according to a predetermined source in response to TS packet status.

14 Claims, 8 Drawing Sheets

(51) Int. Cl.

| | |
|---|---|
| ***H04N 21/239*** | (2011.01) |
| ***H04N 21/438*** | (2011.01) |
| ***H04N 21/44*** | (2011.01) |
| ***H04N 21/462*** | (2011.01) |

(52) U.S. Cl.
CPC ... *H04N 21/4381* (2013.01); *H04N 21/44004* (2013.01); *H04N 21/4622* (2013.01)

(56) References Cited

U.S. PATENT DOCUMENTS

2007/0101379 A1* 5/2007 Pereira ............... H04N 21/2405 725/90
2014/0176795 A1* 6/2014 Joo .................. H04N 21/43072 348/513
2017/0085928 A1 3/2017 Visscher
2020/0099969 A1* 3/2020 Visscher ............ H04N 21/4622
2022/0256232 A1 8/2022 Pesin

FOREIGN PATENT DOCUMENTS

GB 2344974 A * 6/2000 ......... H04Q 11/0478
TW I757034 3/2022

* cited by examiner

SIGNAL COMPENSATION DEVICE AND ASSOCIATED METHOD

BACKGROUND OF THE INVENTION

1. Field of the Invention

The present invention is related to signal compensation, and more particularly, a signal compensation device and an associated method that can provide a user with a better viewing quality by recovering transport stream (TS) packets when signal quality of a digital signal or a network signal is poor.

2. Description of the Prior Art

When a user uses a mobile device (e.g., a mobile phone or a tablet) to watch video provided by a digital signal received from a tuner, the viewing quality will be affected when the digital signal is of poor quality. Similarly, when the video is provided by a network signal received from an internet protocol television (IPTV), the viewing quality will be affected when the network signal is of poor quality.

Therefore, there is an urgent need for a novel signal compensation device and an associated method that can automatically switch to the best image quality for the user through an algorithm.

SUMMARY OF THE INVENTION

It is one of the objectives of the present invention to provide a signal compensation device and an associated method that can provide a user with a better viewing quality by recovering TS packets when signal quality of a digital signal or a network signal is poor, to address the above-mentioned issues.

According to an embodiment of the present invention, a signal compensation device is provided. The signal compensation device comprises a first receiving circuit, a second receiving circuit, a first buffer, a second buffer, a third buffer, and a processing circuit. The first receiving circuit is arranged to receive a first video signal from a first video source. The second receiving circuit is arranged to receive a second video signal from a second video source that is different from the first video source, wherein both the first video signal and the second video signal correspond to a same program. The first buffer is arranged to store a first TS packet group corresponding to the first video signal. The second buffer is arranged to store a second TS packet group corresponding to the second video signal. The processing circuit is arranged to dynamically store a first TS packet of the first TS packet group or a second TS packet of the second TS packet group to the third buffer according to a predetermined source in response to TS packet status, wherein the predetermined source is one of the first video source and the second video source.

According to an embodiment of the present invention, a method for signal dynamic compensation is provided. The method comprises: receiving a first video signal from a first video source; receiving a second video signal from a second video source that is different from the first video source, wherein both the first video signal and the second video signal correspond to a same program; storing a first transport stream (TS) packet group corresponding to the first video signal to a first buffer; storing a second TS packet group corresponding to the second video signal to a second buffer; and dynamically storing a first TS packet of the first TS packet group or a second TS packet of the second TS packet group to a third buffer according to a predetermined source in response to TS packet status, wherein the predetermined source is one of the first video source and the second video source.

One of the benefits of the signal compensation device and the associated method of the present invention is that a TS packet in multiple TS packets corresponding to a digital signal or a TS packet in multiple TS packets corresponding to an internet signal can be dynamically stored to a buffer according to a predetermined source in response to TS packet status (e.g., whether the TS packet is damaged or discontinuous). In this way, when signal quality of the digital signal or the network signal is poor, a better viewing quality can be provided to a user by recovering the TS packets.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
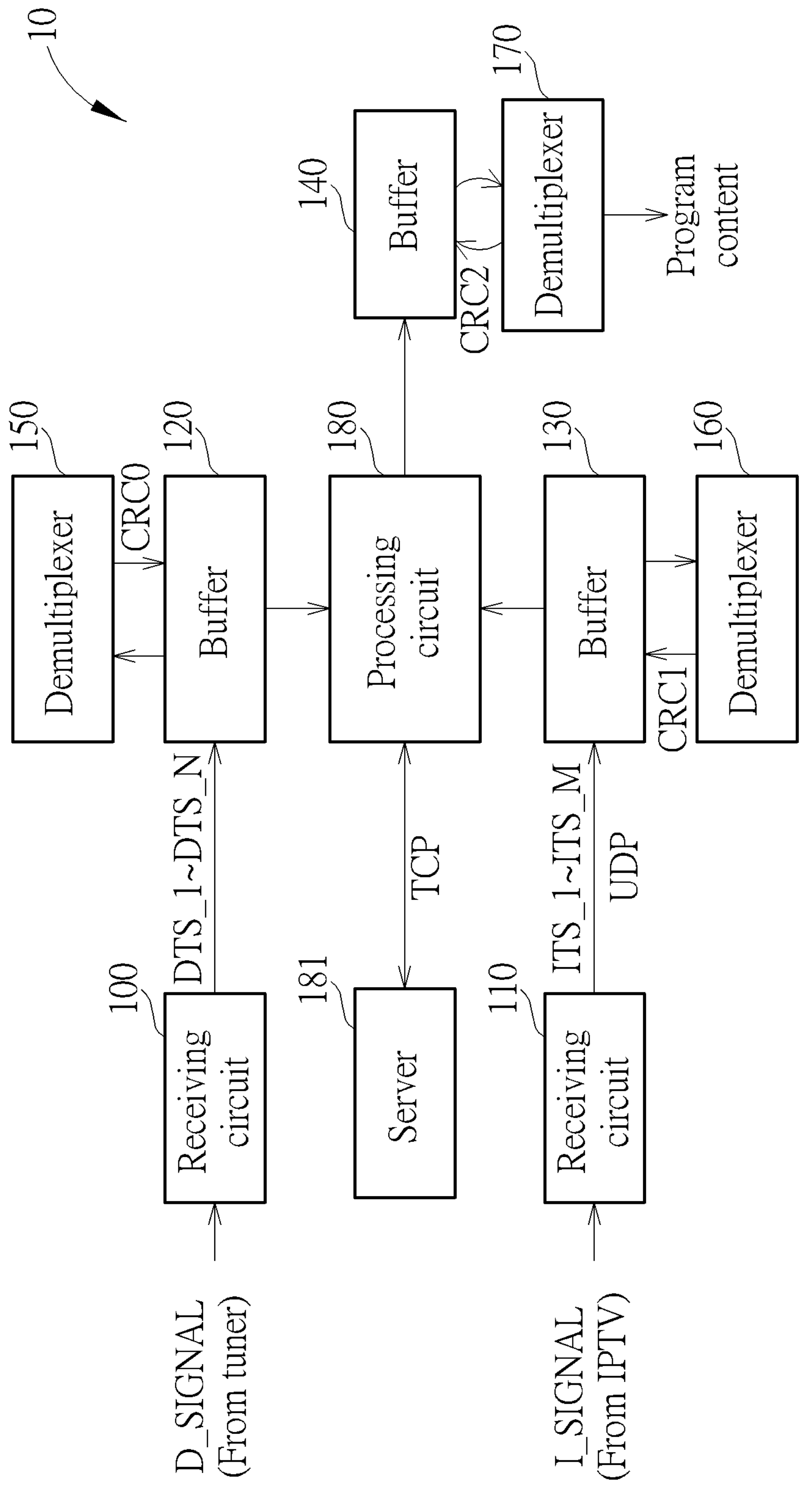
FIG. 1 is a diagram illustrating a signal compensation device according to an embodiment of the present invention.

FIG. 1 is a diagram illustrating a signal compensation device 10 according to an embodiment of the present invention. AS shown in FIG. 1, the signal compensation device 10 may include multiple receiving circuits 100 and 110, multiple buffers 120, 130, and 140, multiple demultiplexers 150, 160, and 170 and a processing circuit 180. The receiving circuit 100 may be arranged to receive a first video signal (e.g., a digital signal D_SIGNAL) from a first video source (e.g., a tuner). The receiving circuit 110 may be arranged to receive a second video signal (e.g., an internet signal I_SIGNAL) from a second video source that is different from the tuner (e.g., an internet protocol television, IPTV), wherein both the digital signal D_SIGNAL and the internet signal I_SIGNAL correspond to a same program. The buffer 120 may be arranged to store multiple transport stream (TS) packets DTS_1-DTS_N (N≥1) corresponding to the digital signal D_SIGNAL from the receiving circuit 100. The buffer 130 may be arranged to store multiple TS packets ITS_1-ITS_M (M≥1) corresponding to the internet signal I_SIGNAL from the receiving circuit 110 through a user datagram protocol (UDP). It should be noted that both a unit of the TS packets DTS_1-DTS_N and a unit of the TS packets ITS_1-ITS_M are packetized elementary stream (PES). In addition, the TS packets DTS_1-DTS_N can be regarded as a first TS packet group, and the TS packets ITS_1-ITS_M can be regarded as a second TS packet group.

Figure 2:
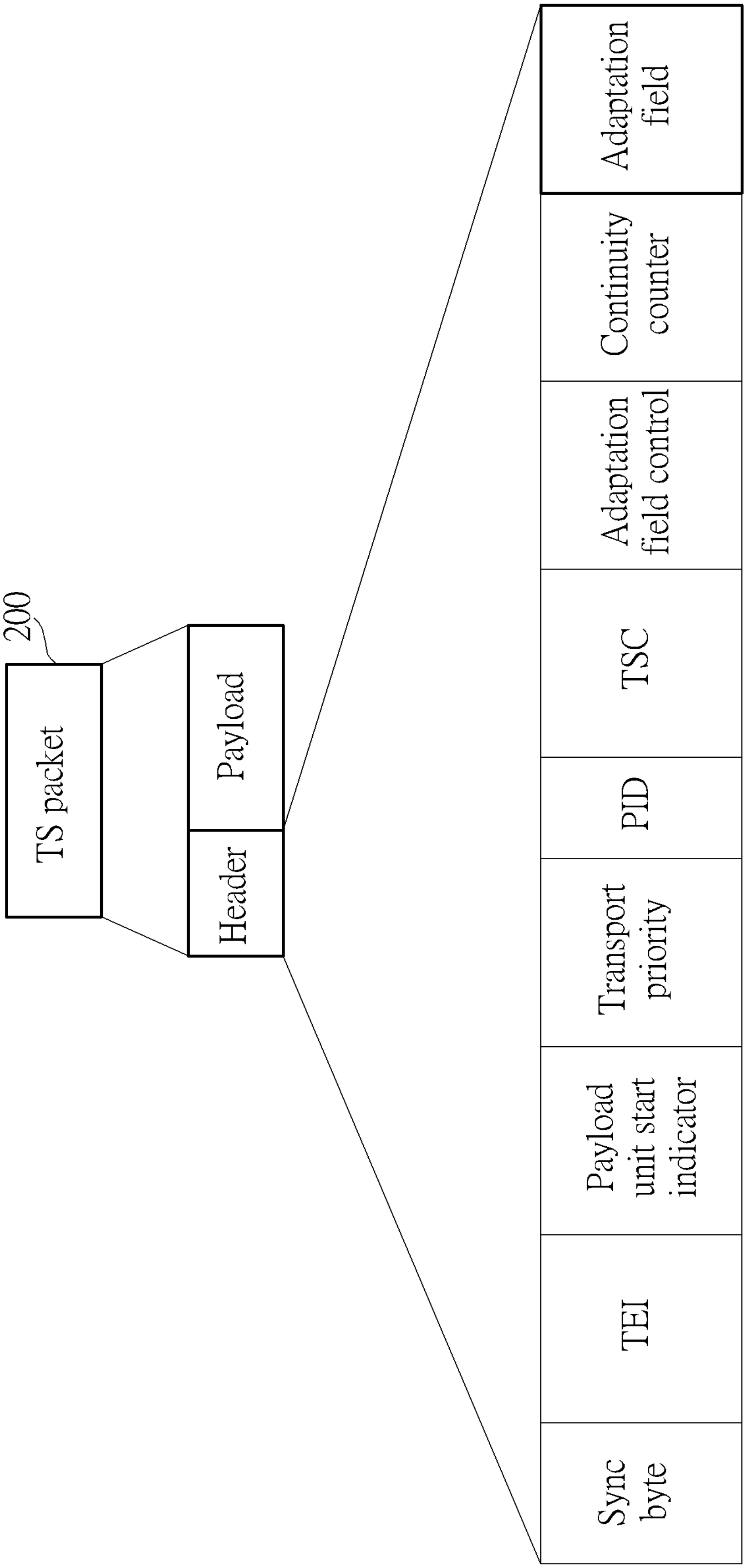
FIG. 2 is a diagram illustrating a format of a TS packet with a unit of packetized elementary stream.

FIG. 2 is a diagram illustrating a format of a TS packet 200 in units of PES, wherein each of the TS packets DTS_1-DTS_N and each of the TS packets ITS_1-ITS_M shown in FIG. 1 can be implemented by the TS packet 200. As shown in FIG. 2, the TS packet 200 may include a header and a payload, wherein the header of the TS packet 200 may include multiple fields defined by ISO/IEC 13818-1 specification and Recommendation ITU-T H.222.0 specification. The multiple fields may include a sync byte of 8 bits, a transport error indicator (TEI) of one bit, a payload unit start indicator of one bit, a transport priority of one bit, a packet ID (PID) of 13 bits, a transport scrambling control (TSC) of 2 bits, an adaptation field control of 2 bits, a continuity counter of 4 bits, and an adaptation field. In addition, the content of the adaptation field is determined by the PID and the adaptation field control, and the adaptation field includes a cyclic redundancy check (CRC) result (not shown). Since the content and function of the multiple fields can be known by referring to the contents of ISO/IEC 13818-1 specification and Recommendation ITU-T H.222.0 specification, and are well known to those skilled in the art, relevant details are not repeated here.

Refer back to FIG. 1. After the buffer 120 stores the TS packets DTS_1-DTS_N, the demultiplexer 150 may be arranged to perform CRC upon the CRC result of the adaption field in each of the TS packets DTS_1-DTS_N to generate a first check result CRC0, and the first check result CRC0 can be stored in the buffer 120. Similarly, after the buffer 130 stores the TS packets ITS_1-ITS_M, the demultiplexer 160 may be arranged to perform CRC upon the CRC result of the adaption field in each of the TS packets ITS_1-ITS_M to generate a second check result CRC1, and the second check result CRC1 can be stored in the buffer 130. It should be noted that each of the TS packets DTS_1-DTS_N can have a respective index according to the first check result CRC0, and each of the TS packets ITS_1-ITS_M can also have a respective index according to the second check result CRC1, wherein according to the indexes, the TS packets DTS_1-DTS_N can correspond to the TS packets ITS_1-ITS_M, respectively, and the corresponding TS packets can recover each other. For example, the TS packet DTS_1 can correspond to the TS packet ITS_1; therefore, when the TS packet DTS_1 is damaged, the TS packet ITS_1 can be used to recover the TS packet DTS_1. Similarly, when the TS packet ITS_1 is damaged, the TS packet DTS_1 can be used to recover the TS packet ITS_1.

The processing circuit 180 can perform signal compensation to automatically switch to the best image quality for a user through an algorithm. For example, the processing circuit 180 can load and execute program code to implement the algorithm for controlling output of TS packets, but the present invention is not limited thereto. In this embodiment, the processing circuit 180 can determine whether each of the TS packets DTS_1-DTS_N and ITS_1-ITS_M is damaged according to the CRC result of the adaptation field in the header of the TS packet. The processing circuit 180 can further determine whether each of the TS packets DTS_1-DTS_N and ITS_1-ITS_M is continuous with a previous TS packet according to the continuity counter in the header of the TS packet. In addition, the processing circuit 180 can be arranged to dynamically store a TS packet of the first TS packet group (i.e., the TS packets DTS_1-DTS_N) or a TS packet of the second TS packet group (i.e., the TS packets ITS_1-ITS_M) to the buffer 140 according to a predetermined source in response to TS packet status (e.g., whether the TS packet is damaged or discontinuous), wherein the predetermined source is one of the tuner and the IPTV. The demultiplexer 170 may be arranged to perform CRC upon the CRC result of adaptation field in each of the TS packets stored in the buffer 140 to generate a third check result CRC2, and parse the TS packets stored in the buffer 140 to output the content of the same program, wherein the third check result CRC2 can be store in the buffer 140.

Figure 3:
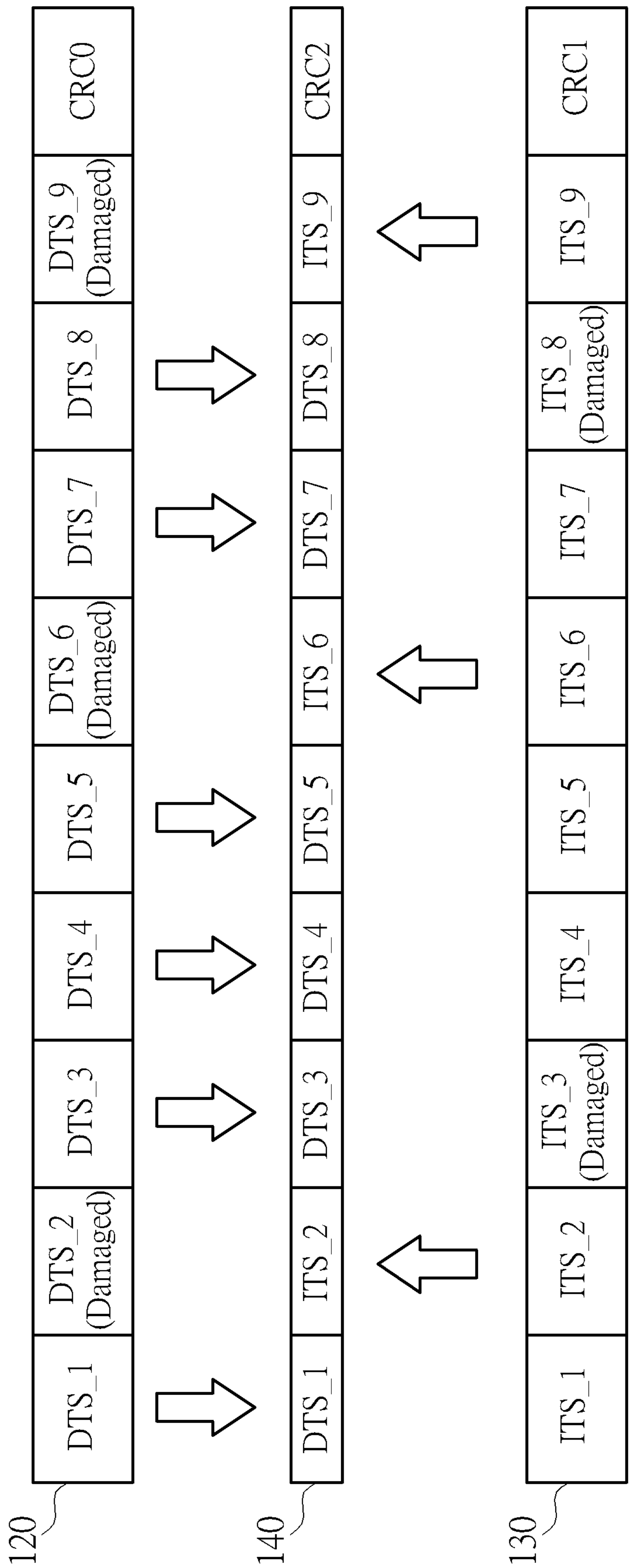
FIG. 3 is a diagram illustrating dynamically storing TS packets by the signal compensation device shown in FIG. 1 according to a first embodiment of the present invention.

FIG. 3 is a diagram illustrating dynamically storing TS packets by the signal compensation device 10 shown in FIG. 1 according to a first embodiment of the present invention. In this embodiment, the tuner is set as the predetermined source, each of the buffers 120, 130, and 140 at least has a storage space, and a size of the storage space is S TS packets (e.g., 10 TS packets, i.e., S=10). The buffer 120 stores a first TS packet group including the TS packets DTS_1-DTS_9 (i.e., N=9) and a check packet including the first check result CRC0. The buffer 130 stores a second TS packet group including the TS packets ITS_1-ITS_9 (i.e., M=9) and a check packet including the second check result CRC1, wherein the TS packet DTS_1 corresponds to the TS packet ITS_1, the TS packet DTS_2 corresponds to the TS packet ITS_2, the TS packet DTS_3 corresponds to the TS packet ITS_3, and so on. In addition, the TS packets DTS_2, DTS_6, DTS_9, ITS_3, and ITS_8 are determined as damaged TS packets. Under a condition that the predetermined source is the tuner, if a TS packet in the buffer 120 is undamaged (e.g., the TS packets DTS_1, DTS_3-DTS_5, DTS_7, and DTS_8), the processing circuit 180 directly stores the TS packet to the buffer 140. If a TS packet in the buffer 120 is damaged (e.g., the TS packets DTS_2, DTS_6, and DTS_9), the processing circuit 180 stores a corresponding TS packet in the buffer 130 (e.g., the TS packets ITS_2, ITS_6, and ITS_9) to the buffer 140. As shown in FIG. 3, under a condition that the predetermined source is the tuner and the TS packet DTS_1 is undamaged, the processing circuit 180 directly stores the TS packet DTS_1 to the buffer 140. Under a condition that the predetermined source is the tuner and the TS packet DTS_2 is damaged, the processing circuit 180 stores the TS packet ITS_2 corresponding to the TS packet DTS_2 to the buffer 140. Under a condition that the predetermined source is the tuner and the TS packet DTS_3 is undamaged, the processing circuit 180 directly stores the TS packet DTS_3 to the buffer 140. For brevity, similar operations for the TS packets DTS_4-DTS_9 and the corresponding TS packets ITS_4-ITS_9 are not repeated in detail here. In another embodiment, the buffers 120, 130, and 140 can be designed to have storage spaces of different sizes.

In some embodiments, the IPTV can be set as the predetermined source. Under a condition that the predetermined source is the IPTV, if a TS packet in the buffer 130 is undamaged, the processing circuit 180 directly stores the TS packet to the buffer 140. If a TS packet in the buffer 130 is damaged, the processing circuit 180 stores a corresponding TS packet in the buffer 120 to the buffer 140. For brevity, similar descriptions for these embodiments are not repeated in detail here.

Figure 4:
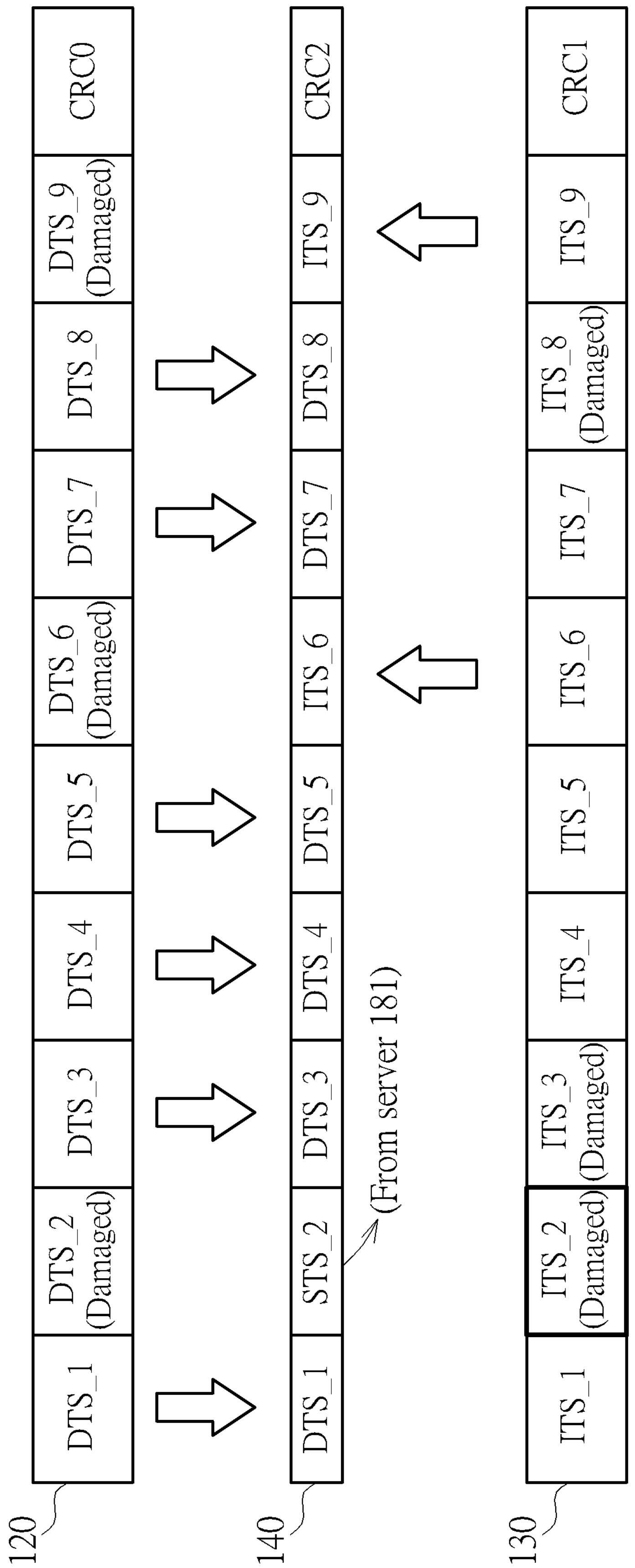
FIG. 4 is a diagram illustrating dynamically storing TS packets by the signal compensation device shown in FIG. 1 according to a second embodiment of the present invention.

FIG. 4 is a diagram illustrating dynamically storing TS packets by the signal compensation device 10 shown in FIG. 1 according to a second embodiment of the present invention. The difference between the second embodiment shown in FIG. 4 and the first embodiment shown in FIG. 3 is that both the TS packet DTS_2 in the buffer 120 and the corresponding TS packet ITS_2 in the buffer 130 are damaged in FIG. 4. Under this situation, according to the adaptation field (more particularly, a program clock reference (PCR) value therein) in the header of the TS packet, the processing circuit 180 can search for a TS packet STS_2 corresponding to the TS packets DTS_2 and ITS_2 from a server (e.g., a server 181 shown in FIG. 1) through a transmission control protocol (TCP), and download and store the TS packet STS_2 to the buffer 130, and then store the TS packet STS_2 in the buffer 140. The operations for processing other TS packets in the second embodiment (i.e., the TS packets DTS_1 and DTS_3-DTS_9 and the corresponding TS packets ITS_1 and ITS_3-ITS_9) by the processing circuit 180 can be known by referring to the first embodiment shown in FIG. 3, and the descriptions are not repeated in detail here.

Figure 5:
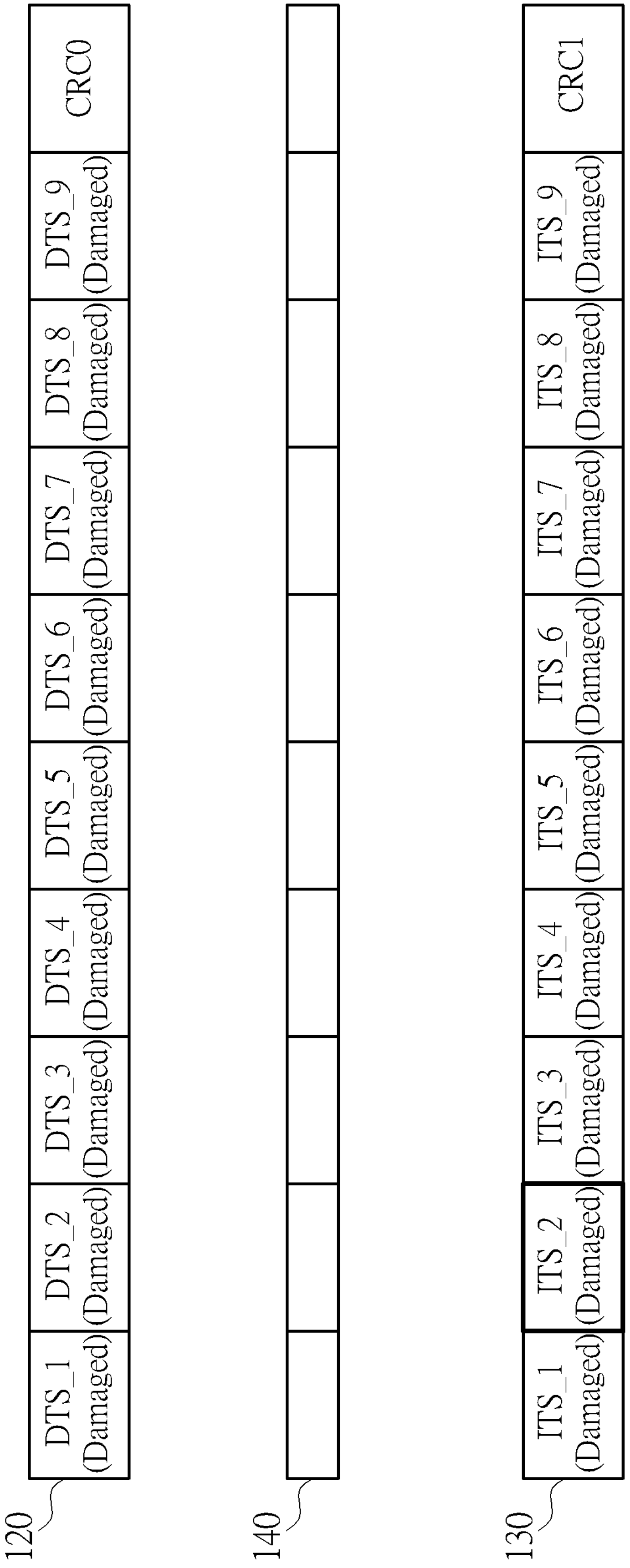
FIG. 5 is a diagram illustrating dynamically storing TS packets by the signal compensation device shown in FIG. 1 according to a third embodiment of the present invention.

It should be noted that, under a condition that both a number of damaged TS packets of the first TS packet group (i.e., the TS packets DTS_1-DTS_9) and a number of damaged TS packets of the second TS packet group (i.e., the TS packets ITS_1-ITS_9) are larger than a ratio of the storage space of the buffers 120, 130, and 140 (e.g., half the size of the storage space, which is S TS packets, i.e., S/2), searching for the corresponding TS packet from the server 181 through the TCP will be time-consuming. As a result, the processing circuit 180 will directly discard all TS packets currently stored in the buffers 120 and 130. FIG. 5 is a diagram illustrating dynamically storing TS packets by the signal compensation device 10 shown in FIG. 1 according to a third embodiment of the present invention. The difference between the third embodiment shown in FIG. 5 and the first embodiment shown in FIG. 3 is that all the TS packets DTS_1-DTS_9 in the buffer 120 and the corresponding TS packets ITS_1-ITS_9 in the buffer 130 are damaged at the same time in FIG. 5. Since both the number of damaged TS packets in the TS packets DTS_1-DTS_9 (i.e., 9 TS packets) and the number of damaged TS packets in the TS packets ITS_1-ITS_9 (i.e., 9 TS packets) are larger than half the size of the storage space of the buffers 120, 130, and 140 (e.g., 10 TS packets, i.e., 10/2=5), the processing circuit 180 will directly discard all TS packets currently stored in the buffers 120 and 130.

Figure 6:
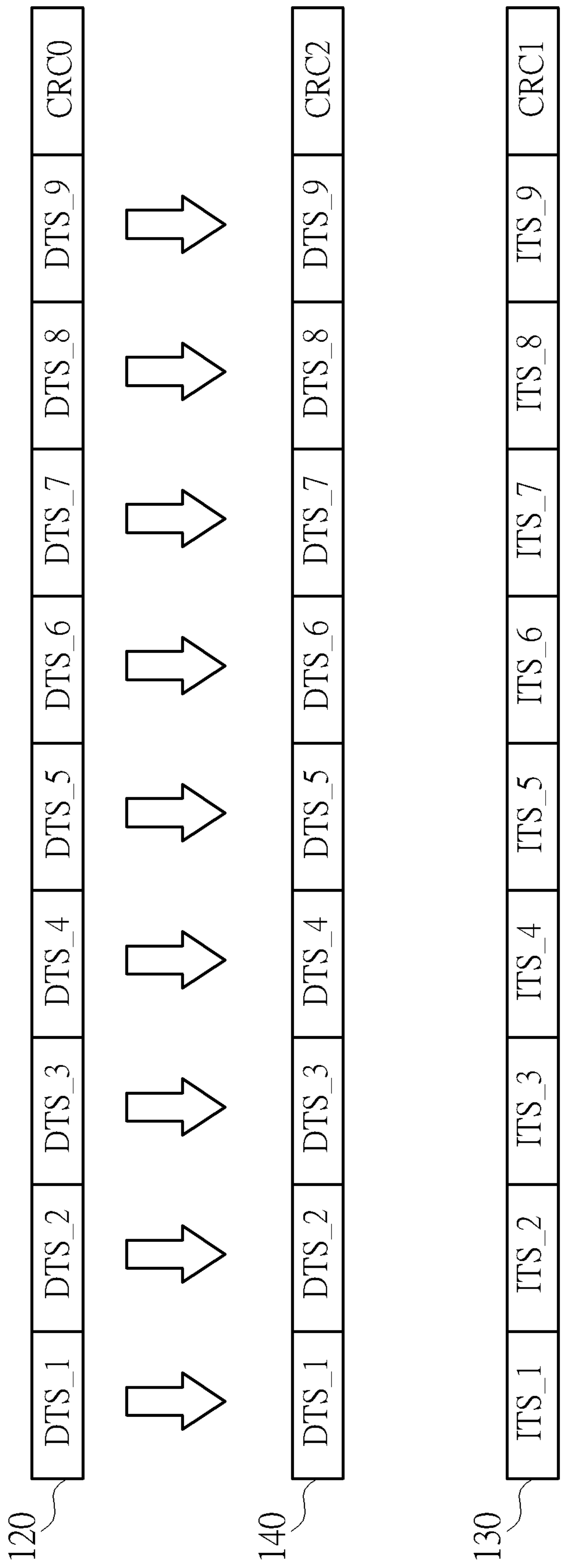
FIG. 6 is a diagram illustrating dynamically storing TS packets by the signal compensation device shown in FIG. 1 according to a fourth embodiment of the present invention.

FIG. 6 is a diagram illustrating dynamically storing TS packets by the signal compensation device 10 shown in FIG. 1 according to a fourth embodiment of the present invention. The difference between the fourth embodiment shown in FIG. 6 and the first embodiment shown in FIG. 3 is that all the TS packets DTS_1-DTS_9 in the buffer 120 are determined as undamaged TS packets in FIG. 6. Under this situation, the processing circuit 180 directly stores all the TS packets DTS_1-DTS_9 to the buffer 140. In some embodiments, the IPTV can be set as the predetermined source. Under a condition that the predetermined source is the IPTV, if all the TS packets in the buffer 130 are undamaged, the processing circuit 180 directly stores all the TS packets in the buffer 130 to the buffer 140. For brevity, similar descriptions for these embodiments are not repeated in detail here.

Figure 7:
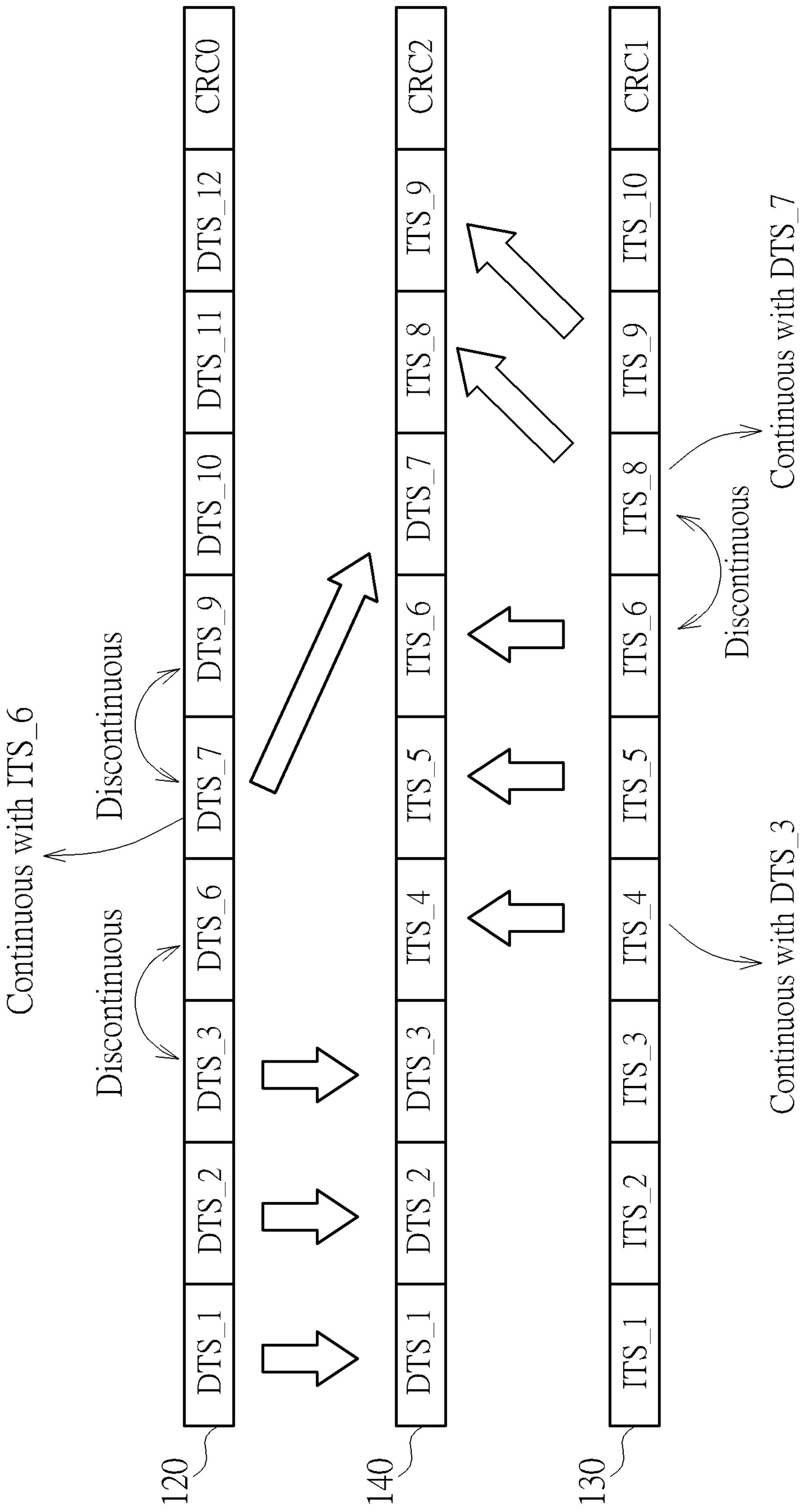
FIG. 7 is a diagram illustrating dynamically storing TS packets by the signal compensation device shown in FIG. 1 according to a fifth embodiment of the present invention.

FIG. 7 is a diagram illustrating dynamically storing TS packets by the signal compensation device 10 shown in FIG. 1 according to a fifth embodiment of the present invention. In this embodiment, the tuner is set as the predetermined source, the buffers 120, 130, and 140 at least have a storage space, and a size of the storage space is S TS packets (e.g., 10 TS packets, i.e., S=10). The buffer 120 stores a first TS packet group including the TS packets DTS_1-DTS_3, DTS_6-DTS_7, and DTS_9-DTS_12 and a check packet including the first check result CRC0. The buffer 130 stores a second TS packet group including the TS packets ITS_1-ITS_6 and ITS_8-ITS_10 and a check packet including the second check result CRC1, wherein all the TS packets DTS_1-DTS_3, DTS_6-DTS_7, DTS_9-DTS_12, ITS_1-ITS_6, and ITS_8-ITS_10 are determined as undamaged TS packets. In the beginning, the processing circuit 180 directly stores the TS packets DTS_1-DTS_3 to the buffer 140. According to the continuity counter in the header of the TS packet, however, the processing circuit 180 determines that the TS packet DTS_6 is discontinuous with the previous TS packet DTS_3. As a result, the processing circuit 180 can store the TS packet ITS_4 that is continuous with the TS packet DTS_3 in the buffer 130 to the buffer 140. In some embodiments, if the TS packet ITS_4 in the buffer 130 is damaged, the processing circuit 180 can request a TS packet that is continuous with the TS packet DTS_3 from the server 181 through the TCP, and download and store the TS packet to the buffers 130 or 140.

Afterwards, the processing circuit 180 stores the TS packets ITS 5 and ITS_6 to the buffer 140. According to the continuity counter in the header of the TS packet, however, the processing circuit 180 determines that the TS packet ITS_8 is discontinuous with the previous TS packet ITS_6. As a result, the processing circuit 180 can store the TS packet DTS_7 that is continuous with the TS packet ITS_6 in the buffer 120 to the buffer 140. In some embodiments, if the TS packet DTS_7 in the buffer 120 is damaged, the processing circuit 180 can request a TS packet that is continuous with the TS packet ITS_6 from the server 181 through the TCP, and download and store the TS packet to the buffers 130 or 140. The operations for processing subsequent TS packets by the processing circuit 180 can be known by referring to the above-mentioned operations, and are not repeated in detail here for brevity.

Figure 8:
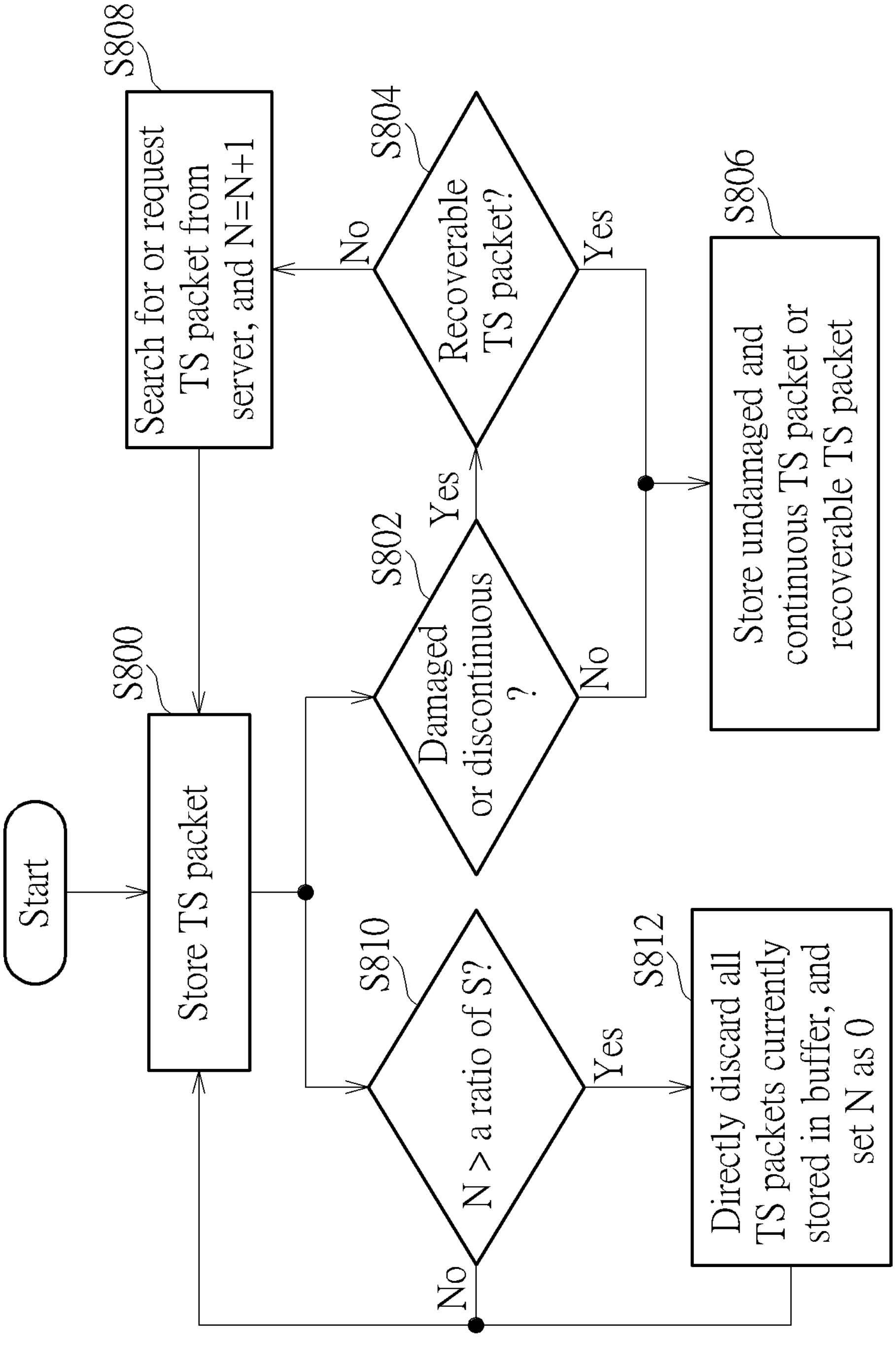
FIG. 8 is a flow chart of a method for signal dynamic compensation according to an embodiment of the present invention.

FIG. 8 is a flow chart of a method for signal dynamic compensation according to an embodiment of the present invention. Provided that the result is substantially the same, the steps are not required to be executed in the exact order shown in FIG. 8. The method for signal dynamic compensation shown in FIG. 8 can be employed by the signal compensation device 10 shown in FIG. 1. For better comprehension, the tuner is set as the predetermined source in this embodiment.

In Step S800, the first TS packet group corresponding to the digital signal D_SIGNAL is stored from the receiving circuit 100 by the buffer 120, and the second TS packet group corresponding to the internet signal I_SIGNAL is stored from the receiving circuit 110 by the buffer 130 through the UDP.

In Step S802, the processing circuit 180 determines whether a TS packet DTS in the buffer 120 is damaged or discontinuous. If the determination is Yes (i.e., the TS packet DTS is damaged or discontinuous), Step S804 is entered; if the determination is No (i.e., the TS packet DTS is undamaged and continuous), Step S806 is entered.

In Step S804, the processing circuit 180 determines whether a recoverable TS packet ITS is included in the buffer 130. If Yes, Step S806 is entered; if No, Step S808 is entered. For example, if the processing circuit 180 determines the TS packet DTS is damaged, the processing circuit 180 determines whether a corresponding TS packet ITS is included in the buffer 130 (i.e., the first embodiment shown in FIG. 3 or the second embodiment shown in FIG. 4). If Yes, Step S806 is entered (i.e., the first embodiment shown in FIG. 3); if No, Step S808 is entered (i.e., the second embodiment shown in FIG. 4). For another example, if the processing circuit 180 determines that the TS packet DTS is discontinuous with a previous TS packet, the processing circuit 180 determines whether the TS packet ITS that is continuous with the previous TS packet is included in the buffer 130 (i.e., the fifth embodiment shown in FIG. 7). If Yes, S806 is entered; if No, Step S808 is entered.

In Step S806, the processing circuit 180 stores the TS packet DTS that is undamaged and continuous or recoverable TS packet ITS to the buffer 140. For example, if the processing circuit 180 determines that the TS packer DTS is damaged, the processing circuit 180 stores the corresponding TS packet ITS in the buffer 130 to the buffer 140. For another example, if the processing circuit 180 determines that the TS packer DTS is discontinuous with a previous packet, the processing circuit 180 stores the TS packet ITS that is continuous with the previous TS packet in the buffer 130 to the buffer 140.

In Step S808, according to the adaptation field (more particularly, the PCR value therein) in the header of the TS packet, the processing circuit 180 can search for a TS packet corresponding to the TS packet DTS from the server 181 through the TCP, or request a TS packet that is continuous with the previous TS packet of the TS packet DTS from the server 181, and download and store the TS packet to the buffers 130 or 140. In addition, the processing circuit 180 can increase 1 to a reset value N (i.e., N=N+1), wherein a predetermined value of the reset value N is 0.

In Step S810, the processing circuit 180 determines whether the reset value N is larger than the ratio of the size of the storage space of the buffers 120, 130, and 140 (e.g., S TS packets). If Yes, step S812 is entered; if No, Step S800 is entered.

In Step S812, the processing circuit 180 directly discards all TS packets currently stored in the buffers 120 and 130, and sets the reset value N as 0.

Since a person skilled in the pertinent art can readily understand details of the steps shown in FIG. 8 after reading the above paragraphs, further description is omitted here for brevity.

In summary, by the signal compensation device and the associated method of the present invention, a TS packet in multiple TS packets corresponding to a digital signal or a TS packet in multiple TS packets corresponding to an internet signal can be dynamically stored to a buffer according to a predetermined source in response to TS packet status (e.g., whether the TS packet is damaged or discontinuous). In this way, when signal quality of the digital signal or the network signal is poor, a better viewing quality can be provided to a user by recovering the TS packets.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal compensation device, comprising:

a first receiving circuit, arranged to receive a first video signal from a first video source;

a second receiving circuit, arranged to receive a second video signal from a second video source that is different from the first video source, wherein both the first video signal and the second video signal correspond to a same program;

a first buffer, arranged to store a first transport stream (TS) packet group corresponding to the first video signal;

a second buffer, arranged to store a second TS packet group corresponding to the second video signal;

a third buffer; and a processing circuit, arranged to dynamically store a first TS packet of the first TS packet group or a second TS packet of the second TS packet group to the third buffer according to a predetermined source in response to TS packet status, wherein the predetermined source is one of the first video source and the second video source;

wherein the first TS packet corresponds to the second TS packet; in response to both the first TS packet and the second TS packet being damaged, the processing circuit searches for a third TS packet from a server according to a content of an adaptation field in a header of the first TS packet or the second TS packet; and in response to the third TS packet being searched from the server, the processing circuit downloads the third TS packet from the server for storing to the second buffer or the third buffer.

2. The signal compensation device of claim 1, wherein the first video source is a tuner; the second video source is an internet protocol television (IPTV); and both a unit of the first TS packet group and a unit of the second TS packet group are packetized elementary stream (PES).

3. The signal compensation device of claim 1, wherein when the predetermined source is the first video source, the first TS packet is damaged, and the second TS packet is undamaged, the processing circuit stores the second TS packet to the third buffer; and when the predetermined source is the second video source, the second TS packet is damaged, and the first TS packet is undamaged, the processing circuit stores the first TS packet to the third buffer.

4. The signal compensation device of claim 1, wherein the first buffer and the second buffer at least have a storage space, and in response to both a number of damaged TS packets of the first TS packet group and a number of damaged TS packets of the second TS packet group being larger than a ratio of the storage space, the processing circuit directly discards all TS packets currently stored in the first buffer and the second buffer.

5. The signal compensation device of claim 1, wherein when the predetermined source is the first video source and all first TS packets of the first TS packet group are undamaged, the processing circuit stores said all first packets of the first TS packet group to the third buffer; and when the predetermined source is the second video source and all second TS packets of the second TS packet group are undamaged, the processing circuit stores said all second TS packets of the second TS packet group to the third buffer.

6. The signal compensation device of claim 1, wherein a first previous TS packet is an immediately preceding packet of the first TS packet within the first TS packet group; a second previous TS packet is an immediately preceding packet of the second TS packet within the second TS packet group; when the first TS packet is discontinuous with the first previous TS packet, the processing circuit stores a fourth TS packet of the second TS packet group that is continuous with the first previous TS packet of the first TS packet to the third buffer; and when the second TS packet is discontinuous with the second previous TS packet, the processing circuit stores a fifth TS packet of the first TS packet group that is continuous with the second previous TS packet of the second TS packet to the third buffer.

7. The signal compensation device of claim 6, wherein when the fourth TS packet is damaged, the processing circuit requests a TS packet that is continuous with the first previous TS packet from the server; and when the fifth TS packet is damaged, the processing circuit requests a TS packet that is continuous with the second previous TS packet from the server.

8. A method for signal dynamic compensation, comprising:

receiving a first video signal from a first video source;

receiving a second video signal from a second video source that is different from the first video source, wherein both the first video signal and the second video signal correspond to a same program;

storing a first transport stream (TS) packet group corresponding to the first video signal to a first buffer;

storing a second TS packet group corresponding to the second video signal to a second buffer; and dynamically storing a first TS packet of the first TS packet group or a second TS packet of the second TS packet group to a third buffer according to a predetermined source in response to TS packet status, wherein the predetermined source is one of the first video source and the second video source;

wherein the first TS packet corresponds to the second TS packet, and the step of dynamically storing the first TS packet of the first TS packet group or the second TS packet of the second TS packet group to the third buffer according to the predetermined source in response to TS packet status comprises:

in response to both the first TS packet and the second TS packet being damaged, searching for a third TS packet from a server according to a content of an adaptation field in a header of the first TS packet or the second TS packet; and in response to the third TS packet being searched from the server, downloading the third TS packet from the server for storing to the second buffer or the third buffer.

9. The method of claim 8, wherein the first video source is a tuner; the second video source is an internet protocol television (IPTV); and both a unit of the first TS packet group and a unit of the second TS packet group are packetized elementary stream (PES).

10. The method of claim 8, wherein the step of dynamically storing the first TS packet of the first TS packet group or the second TS packet of the second TS packet group to the third buffer according to the predetermined source in response to TS packet status comprises:

in response to the predetermined source being the first video source, the first TS packet being damaged, and the second TS packet being undamaged, storing the second TS packet to the third buffer; and in response to the predetermined source being the second video source, the second TS packet being damaged, and the first TS packet being undamaged, storing the first TS packet to the third buffer.

11. The method of claim 8, wherein the first buffer and the second buffer at least have a storage space, and the step of in response to the third TS packet being searched from the server, downloading the third TS packet from the server for storing to the second buffer or the third buffer comprises:

in response to both a number of damaged TS packets of the first TS packet group and a number of damaged TS packets of the second TS packet group being larger than a ratio of the storage space, directly discarding all TS packets currently stored in the first buffer and the second buffer.

12. The method of claim 8, wherein the step of dynamically storing the first TS packet of the first TS packet group or the second TS packet of the second TS packet group to the third buffer according to the predetermined source in response to TS packet status comprises:

in response to the predetermined source being the first video source and all first TS packets of the first TS packet group being undamaged, storing said all first packets of the first TS packet group to the third buffer; and in response to the predetermined source being the second video source and all second TS packets of the second TS packet group being undamaged, storing said all second TS packets of the second TS packet group to the third buffer.

13. The method of claim 8, wherein a first previous TS packet is an immediately preceding packet of the first TS packet within the first TS packet group; a second previous TS packet is an immediately preceding packet of the second TS packet within the second TS packet group; and the step of dynamically storing the first TS packet of the first TS packet group or the second TS packet of the second TS packet group to the third buffer according to the predetermined source in response to TS packet status comprises:

in response to the first TS packet being discontinuous with the first previous TS packet, storing a fourth TS packet of the second TS packet group that is continuous with the first previous TS packet of the first TS packet to the third buffer; and in response to the second TS packet being discontinuous with the second previous TS packet, storing a fifth TS packet of the first TS packet group that is continuous with the second previous TS packet of the second TS packet to the third buffer.

14. The method of claim 13, further comprising:

in response to the fourth TS packet being damaged, requesting a TS packet that is continuous with the first previous TS packet from the server; and in response to the fifth TS packet being damaged, requesting a TS packet that is continuous with the second previous TS packet from the server.

* * * * *